United States Patent [19]

Carner

[11] Patent Number: 4,885,864
[45] Date of Patent: Dec. 12, 1989

[54] FISHING LURE USING INFRARED ATTRACTING MEANS

[76] Inventor: Barbara A. Carner, 9916 Dickens Ave., Bethesda, Md. 20814

[21] Appl. No.: 244,022

[22] Filed: Sep. 14, 1988

[51] Int. Cl.$^4$ ............................................. A01K 85/00
[52] U.S. Cl. ...................................... 43/17.5; 43/17.6
[58] Field of Search .................. 43/17.6, 4, 4.5, 42.32, 43/42.33, 17.5

[56] References Cited

U.S. PATENT DOCUMENTS

| | | | |
|---|---|---|---|
| 3,987,578 | 10/1976 | Rueff | 43/139 |
| 4,411,694 | 10/1983 | Spackova et al. | 43/121 |
| 4,429,482 | 2/1984 | Honse | 43/42.33 |

Primary Examiner—Richard K. Seidel
Assistant Examiner—Michael William Starkweather
Attorney, Agent, or Firm—Joseph J. Zito

[57] ABSTRACT

A fishing lure having an infrared light source for enabling the lure to attract fish in daylight, at night or in otherwise darkened underwater conditions.

6 Claims, 2 Drawing Sheets

FISHING LURE USING INFRARED ATTRACTING MEANS

BACKGROUND OF THE INVENTION

The present invention relates to fishing tackle possessed by well equipped anglers. More specifically, the present invention relates to fishing lures having enhanced characteristics for increased fish attraction.

There are numerous man-made fishing lures which claim to rival the worm in their ability to attract fish. Some utilize bright colored tassels, others sparkle as they reflect sunlight. Many are designed with elaborate spinners which rotate as the lure is moved through the water. In still others, the whole lure is imparted with movement in an effort to entice fish.

Still other lures such as those taught in U.S. Pat. Nos. 4,347,681 to Fima and 4,227,331 to Ursrey possess artificial lighting charactoristics. Lures such as these can acheive notice by fish, however, they are often wholey inadequate in acheiving attraction of fish.

The abilities of these man-made contrivances to attract fish vary widely, dependent on the lure design and the species of fish sought as game. Artificial lures have advantages over live bait in the lures are often reusable. Lures can remain submerged on a line for extended periods of time without the deterioration experienced by live bait.

SUMMARY OF THE INVENTION

The lures available on the market provide an angler with an immense variety from which to select an appropriate tool for the task at hand. However, most lures are designed for effectiveness in bright sun, while some are designed to aid the angler in the hours of darkness by imitation of sunlight. Bright colors and reflective features become ineffective as sunlight diminishes. Further, those lures providing artificial light may provide enhanced attraction in dim lighting, but are useless in bright sunlight.

The present invention provides a unique form of self illumination, attracting fish at night, on dark days, at depths where sunlight does not reach and in full sunshine. The illumination can be utilized alone to attract fish or can be combined with any number of the auxiliary features taught in the present invention to provide enhanced attraction. Other portions of the lure can be coated to provide for reflection or disbursement of the illumination of the present invention.

An object of the present invention is to provide a dual purpose fishing lure useful as an aid in snagging fish both day and night.

Another object of the present invention is to provide a lure which attracts fish from a great distance, and can entice and entrap numerous fish at once.

Yet another object of the present invention is to provide a lure for bottom fishing, trolling, casting or spinning which can be utilized in fresh or salt water, day or night.

BRIEF DESCRIPTION OF THE DRAWINGS

For a further understanding of the nature and objects of the present invention, reference should be had to the following detailed description, taken in conjunction with the accompanying drawings in which like parts are given like reference numerals and wherein.

DETAILED DESCRIPTION OF PREFERRED EXEMPLARY EMBODIMENTS

Figure 1:
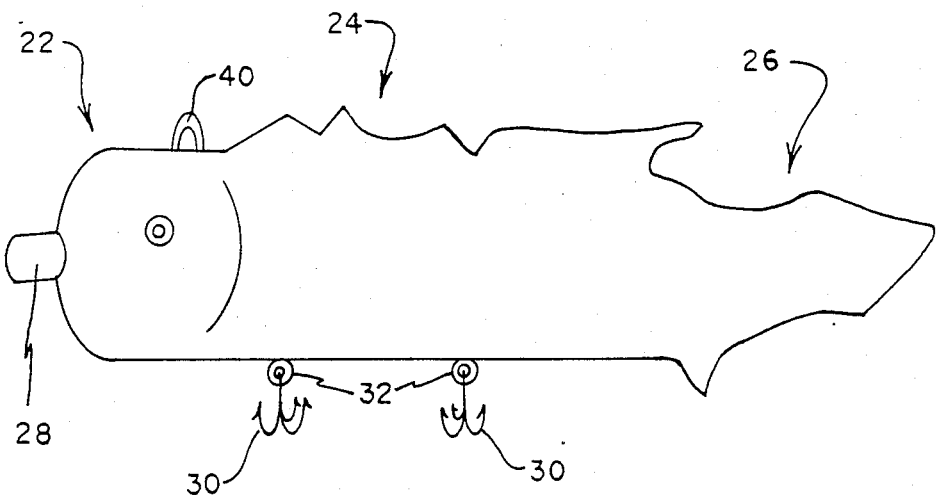
FIG. 1 is a side elevational view of a lure constructed in accordance with the teachings of the present invention.

The lure illustrated in FIG. 1 is constructed with a fish like style, having a head portion generally at 22, a body portion at 24 and a tail section at 26. The lure can be constructed in any desired shape or style, and can be configured appropriately for the desired fish to be attracted. The design of the lure of FIG. 1 is for illustrative purposes only and should not be construed as limiting the present invention to any shape or class of lures.

Figure 2:
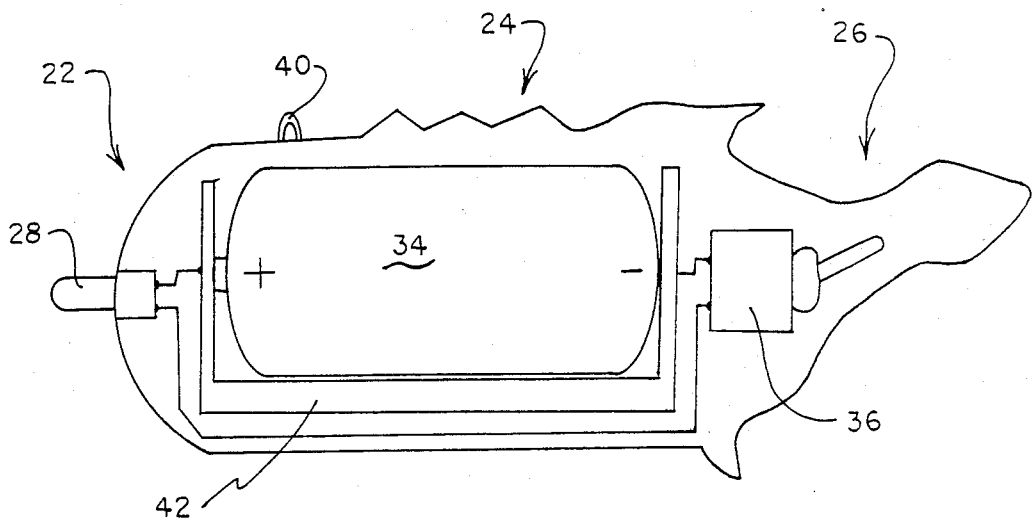
FIG. 2 is a side cross-sectional view of a lure constructed in accordance with the teachings of the present invention.
Figure 3A:
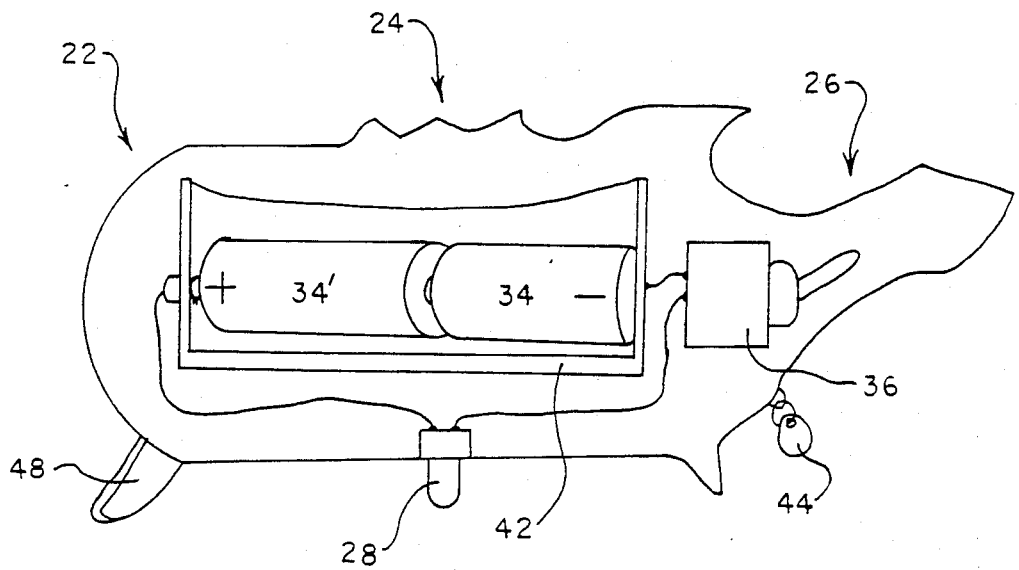
FIGS. 3A and 3B are side cross-sectional views of lures constructed in accordance with the teachings of the present invention.
Figure 3B:
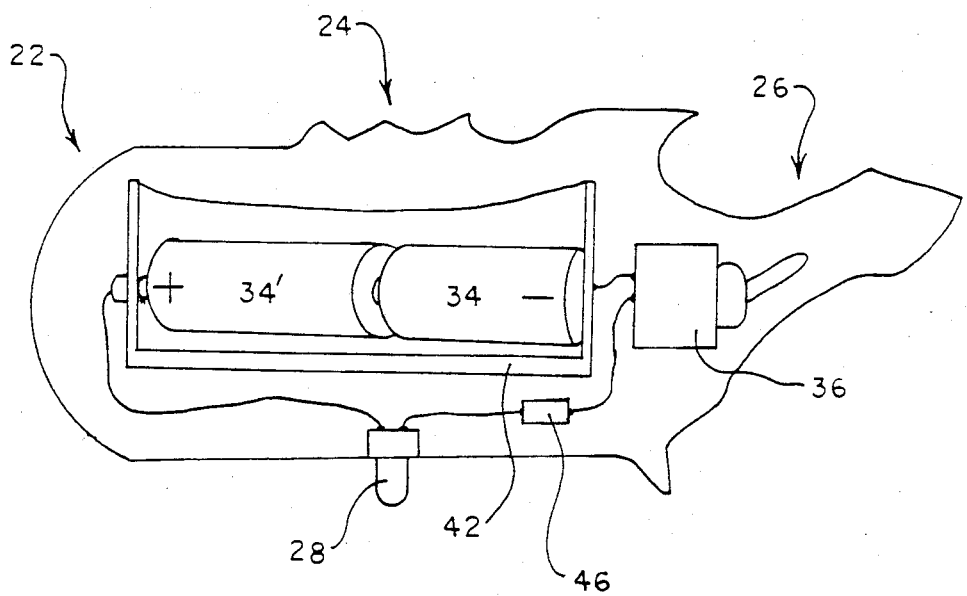

The lure includes an infrared emission source 28, which can be positioned at any point along the lure, such as the front as illustrated in FIGS. 1 and 2 or on the underside as illustrated in FIGS. 3A and 3B. It has been found that a source 28 emitting rays in the infrared portion of the spectrum is most effective in the attraction of fish. The source 28, should be of proper size, shape and configuration appropriate to the lure.

The superiority of the present invention over lures utilizing light sources emitting within the visible portion of the spectrum is demonstrated in the relative attractive effects upon fish. The unnatural lighting effect of artificial light within the visible spectrum almost consistently results in the frightening of fish. Although the fish notice the lighted lure, they are almost uniformly repulsed and therefore the use of light within the visible spectrum is significantly less effective.

Contrasted with the effect of visible light is the significant attraction of fish toward a source emitting within the infrared portion of the spectrum. Fish often react by darting toward the source 28 in a reaction similar to live bait. Fish appear to interpret the sensing of infrared radiation as indicative of originating from a live food source, in sharp contrast to the interpretation of visible light as originating from an artificial source. This may be based on the typical spectrum of emmissions of common food sources. The response of fish increases as the intensity of the infrared source 28 is increased. This effect can be exploited through the provision of an automatic or manual intensity adjustment control as taught below.

Although infrared radiation cannot be detected by the human eye, as infrared lies beyond the edge of the visible spectrum as it is defined for people, the difference in the eye structure of fish enables a degree of detection as taught herein. The variance in the rod and cone structure of the eyes of seeing fish allows a detection in the infrared range. This detection can be exploited as taught herein to enable the construction of a superior lure.

Since infrared rays have reflection and refraction characteristics similar to visible light, any of a variety of visibility modification attachments, as detailed below, can be utilized in combination with the teachings of the present invention to enhance the attractive characteristics of the lure.

The shape of the lens of the eyes of a fish provide it with the highest refractive index of all vertebrates.

Therefore the fish will be more readily cognizant of a source of radiation due to the enhanced collection and concentration of the eye structure. Therefore, the use of a source within the most attractive section of the spectrum is critical to effective construction of effective lures. Combined with the fact that as many as three-quarters of the thousands of varieties of fish have light sensitive organ system, the present invention teaches the proper construction of a lighted lure, essential to effective attraction.

The lure, as illustrated in FIG. 1, also can be comprised of a number of multiple hooks 30 suspend from it to ensnare fish. The conventionally styled tri-hooks 30 are attached to the body of the lure by steel rings 32. Any style can be utilized, such as single or double hooks, and they may be attached to the lure in any manner affording adequate securence.

As illustrated in FIG. 2, the source 28 is supplied with energy from battery 34. Switch 36 in flexible tail 26 is utilized to activate the lamp. The angler attaches his line to the loop 40 and then bends the tail 26 to trip switch 36 to actuate the source 28. Power is supplied from battery 34, which is mounted in holder 42. The holder 42 can be eliminated by forming the interior of the lure properly so that the battery 34 is adequately cradled. The lure is then placed into the water to attract fish. Once the angler has finished with the lure, he again bends the tail 26 to deactivate the source 28.

The manual switch 36 can be replaced with an automatic switch which can be configured to react to a predesignated schedual or to any of a number of stimli such as immersion in water, motion of the lure, etc.

FIG. 3A illustrates an embodiment where the source 28' is mounted on the underside instead of the front of the lure, making the source 28' and therefore the lure visible to fish below. The lure of FIG. 3A also includes a spinner 44 which reflects the source 28' emissions enhancing fish attraction. Source 28' can be comprised of an automatically blinking type lamp and can be selected in any standard manner to provide intermittent or regularly sequenced blinking.

FIG. 3A also illustrates the optional use of an automatic intensity control 48. The device automatically varies the intensity of the emitted infrared radiation through control of the supply of power from the battery 34. The control can operate on a predesignated pattern of intensity variation or can react to differing light conditions to achieve varied intensity. Other methods of altering the intensity of the emitted radiation such as a filter or screen placed over the source 28 to block a portion of the rays are available and contemplated as encompassed by the present invention. The present invention does not require a means for regulation of the intensity of the emissions, as a lure constructed in accordance with the teachings of the present invention with a constant intensity would yeild positive attractive effects. The variability of intensity is taught as an enhancement option when desirable.

The intensity control 48 illustrated in FIG. 3A can also be provided with an external adjustment knob 50 as illustrated to allow for manual setting of the intensity level. This feature allows for the angler to make infield adjustments to achieve optimal effectiveness based on real time observations of the effectiveness of the lure. The manual adjustment 50 also allows for correction by the angler for changing conditions during fishing.

In FIG. 3B, an interrupter 46 is also illustrated between the source 28 and the battery 34 to affect blinking of the source 28. The interrupter 46 can be of any intermittent type which turns on and off the power. The interrupter 46 can be utilized in any embodiment of the lure to cause source 28 to intermittently emit infrared rays. The interrupter 46 can be constructed to provide any desired blinking pattern or sequence from the source 28.

FIG. 3A and 3B also illustrate the use of two batteries 34 and 34'. The amount of power provided will depend on the source requirements as well as the desired life of operation, these factors are a matter of design within ordinary skill in the art. Any of the various enhancements illustrated in FIGS. 2, 3A or 3B can be utilized alone or in any combination desired to provide appropriate attractive effect to the lure.

The lure in an exemplary embodiment, is constructed with a unitary shell which will ensure a complete watertight seal for the batteries 34 and the source 28. The seal can be permanent, rendering the batteries 34 and the source 28 non-replaceable, or can operate to provide for battery and source replacement. Also, as stated earlier, the interior of the body of the lure can be fashioned as a battery cradle.

The lure can still be functional after expiration of the batteries 34, or if the source has become inoperable. The lure will no longer emit its own light, but will continue to attract fish in daylight hours.

The lure can also be equipped with a depth regulator 48 as illustrated in FIG. 3B, if desired. This will permit the lure to be positioned at a desired depth to permit optimum use of the lighting characteristics.

Because many varying and different embodiments may be made within the scope of the inventive concept herein taught, and because many modifications may be made in the embodiments herein detailed in accordance with the descriptive requirements of the law, it is to be understood that the details herein are to be interpreted as illustrated and not in a limiting sense.

I claim:

1. A fishing lure, comprising:
   a watertight fishing lure shaped body,
   an infrared source mounted to said body,
   energy supply means within said body for stimulating said source to emit infrared radiation and wherein said energy supply means includes
   energy storage means for providing energy for said infrared source.

2. The lure of claim 1, wherein said energy supply means further includes;
   switch means for operatively connecting said energy storage means and said infrared source.

3. The lamp of claim 1, further comprising;
   means for reflecting said infrared radiation, movably attached to said body.

4. The lamp of claim 1, further comprising;
   means for causing said source to intermittently emit said infrared radiation.

5. The lamp of claim 1, further comprising;
   means for selectively adjusting the intensity of said infrared radiation.

6. A fishing lure, comprising:
   a watertight fishing lure shaped body,
   an infrared source mounted to said body,
   energy storage means for providing energy for said infrared source,
   switch means for operatively connecting said energy storage means and said infrared source,
   means for reflecting said infrared radiation, movably attached to said body,
   means for causing said source to intermittently emit said infrared radiation, and
   means for adjusting the intensity of said infrared radiation.

* * * * *